(12) United States Patent
Li (10) Patent No.: US 12,233,931 B2
(45) Date of Patent: Feb. 25, 2025

(54) VEHICLE FRAME AND BABY STROLLER

(71) Applicant: Wonderland Switzerland AG, Steinhausen (CH)

(72) Inventor: Jian-Qun Li, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/419,568

(22) Filed: Jan. 23, 2024

(65) Prior Publication Data

US 2024/0157994 A1    May 16, 2024

Related U.S. Application Data (63) Continuation of application No. 16/734,427, filed on Jan. 6, 2020, now Pat. No. 11,912,328.

(30) Foreign Application Priority Data

Jan. 7, 2019    (CN) .......................... 201910012594.0

(51) Int. Cl.
     *B62B 7/08*          (2006.01)

(52) U.S. Cl.
     CPC ...................................... *B62B 7/08* (2013.01)

(58) Field of Classification Search
     CPC ....................................................... B62B 7/08
     See application file for complete search history.

(56) References Cited

U.S. PATENT DOCUMENTS

| | | | |
|---|---|---|---|
| 6,102,431 A | 8/2000 | Sutherland | |
| 2008/0079240 A1 | 4/2008 | Yeh | |
| 2015/0076775 A1 | 3/2015 | Wu | |
| 2015/0166092 A1 | 6/2015 | Bost | |
| 2016/0311455 A1* | 10/2016 | Li | ............ B62B 7/145 |
| 2017/0096158 A1* | 4/2017 | Hanson | ............ B60B 33/026 |
| 2017/0174244 A1 | 6/2017 | Sack | |
| 2017/0217470 A1 | 8/2017 | Popp | |
| 2017/0247043 A1 | 8/2017 | Sack | |
| 2017/0267272 A1* | 9/2017 | Gao | ............ B62B 7/08 |

FOREIGN PATENT DOCUMENTS

| | | |
|---|---|---|
| CN | 103661544 A | 3/2014 |
| CN | 205010298 U | 2/2016 |
| CN | 106143575 A | 11/2016 |

(Continued)

*Primary Examiner* — Bryan A Evans
(74) *Attorney, Agent, or Firm* — CANTOR COLBURN LLP (57) ABSTRACT

A vehicle frame applied to a baby stroller includes a first tube, a second tube, a third tube and a foldable unit. The second tube is pivoted to the first tube. The third tube is pivoted to the second tube. The foldable unit includes a fourth tube. An end of the fourth tube is pivoted to the first tube, and the other end of the fourth tube is pivoted to the third tube. A linkage mechanism is formed by the first tube, the second tube, the third tube and the fourth tube. Rotation of the first tube moves the second tube and the third tube close to each other or away from each other via the fourth tube for folding or unfolding the vehicle frame. The present invention can simultaneously fold all tubes of the vehicle frame, and have advantages the simple structure, easy operation and low production cost.

18 Claims, 8 Drawing Sheets

(56) References Cited

FOREIGN PATENT DOCUMENTS

| | | |
|---|---|---|
| CN | 106741091 A | 5/2017 |
| CN | 107128352 A | 9/2017 |
| CN | 108068871 A | 5/2018 |
| CN | 207984930 U | 10/2018 |
| EP | 2 952 408 A2 | 12/2015 |
| EP | 2 952 408 A3 | 1/2016 |
| GB | 2547515 A | 8/2017 |
| WO | 2018/047007 A1 | 3/2018 |

\* cited by examiner

VEHICLE FRAME AND BABY STROLLER

CROSS REFERENCE TO RELATED APPLICATIONS

This application is a continuation application of U.S. application Ser. No. 16/734,427, filed on Jan. 6, 2020. The content of the application is incorporated herein by reference.

BACKGROUND OF THE INVENTION

1. Field of the Invention

The present invention relates to a vehicle frame and a baby stroller, and more particularly, to a vehicle frame and a baby stroller capable of simultaneously folding an integral frame and providing advantages of convenient folding, simple structure and easy operation.

2. Description of the Prior Art

In modern design of a vehicle frame, the vehicle frame provides a folding function and an unfolding function for satisfying customer's demand, such as preferred practicability and portable convenience. The vehicle frame can be fully unfolded in the using state, and further can be folded into a minimal volume for storage and convenient carrying when not in use. A front foot, a rear foot and a handle of the conventional vehicle frame have to be forced for folding the whole frame, so that one folding structure is disposed between the front foot and the rear foot and another folding structure is disposed between the front foot and the handle, or one folding structure is disposed between the front foot and the rear foot and another folding structure is disposed between the rear foot and the handle. For minimizing the conventional vehicle frame, a user stoops down to fold the front foot and the rear foot, and then fold the handle relative to the front foot or the rear foot, so as to achieve integral folding operation of the conventional vehicle frame. Thus, the user uses two hands to execute several operative motion or operative process in course of folding, which means the conventional vehicle frame has complicated operation; besides, the user has to stoop down for folding the conventional vehicle frame, which has drawbacks of inconvenient execution and troublesome utilization. Design of a new vehicle frame for easily folding and unfolding is an important issue in a related industry.

SUMMARY OF THE INVENTION

The present invention provides a vehicle frame capable of simultaneously folding an integral frame and providing advantages of convenient folding, simple structure and easy operation for solving above drawbacks.

The present invention provides a baby stroller capable of simultaneously folding a whole vehicle frame and providing advantages of convenient folding, simple structure and easy operation for solving above drawbacks.

For achieving the foresaid aim, the vehicle frame includes a first tube, a second tube, a third tube, a foldable unit and a locking device. The second tube is pivoted to the first tube. The third tube is pivoted to the second tube. The foldable unit includes a fourth tube. An end of the fourth tube is pivoted to the first tube, and the other end of the fourth tube is pivoted to the third tube. A linkage mechanism is formed by connection between the first tube, the second tube, the third tube and the fourth tube. Rotation of the first tube is adapted to move the second tube and the third tube close to each other or away from each other via link of the fourth tube for folding or unfolding the vehicle frame. The locking device is disposed on the linkage mechanism and adapted to lock motion of the linkage mechanism. The first tube and the fourth tube are pivoted via the locking device. The locking device includes a first installing component, a second installing component and a locking component. The first tube is connected to the first installing component. The fourth tube is connected to the second installing component. The first installing component is pivoted to the second installing component. The locking component is movably disposed between the first installing component and the second installing component, so as to lock or unlock a pivot of the first installing component relative to the second installing component via motion of the locking component.

For achieving the foresaid aim, the baby stroller of the present invention includes a vehicle frame and a baby seat disposed on the vehicle frame. The vehicle frame includes a handling tube, a front foot tube, a rear foot tube, a foldable unit and a locking device. The handling tube is pivoted to the front foot tube, and the front foot tube is pivoted to the rear foot tube. The foldable unit includes a supporting tube. An end of the supporting tube is pivoted to the handling tube, and the other end of the supporting tube is pivoted to the rear foot tube. A linkage mechanism is formed by connection between the handling tube, the front foot tube, the rear foot tube and the supporting tube. Rotation of the handling tube is adapted to move the front foot tube and the rear foot tube close to each other or away from each other via link of the supporting tube for folding or unfolding the vehicle frame. The locking device is disposed on the linkage mechanism and adapted to lock motion of the linkage mechanism. The locking device includes a first installing component, a second installing component and a locking component. The handling tube is connected to the first installing component, the supporting tube is connected to the second installing component, the first installing component is pivoted to the second installing component, the locking component is movably disposed between the first installing component and the second installing component, so as to lock or unlock a pivot of the first installing component relative to the second installing component via motion of the locking component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
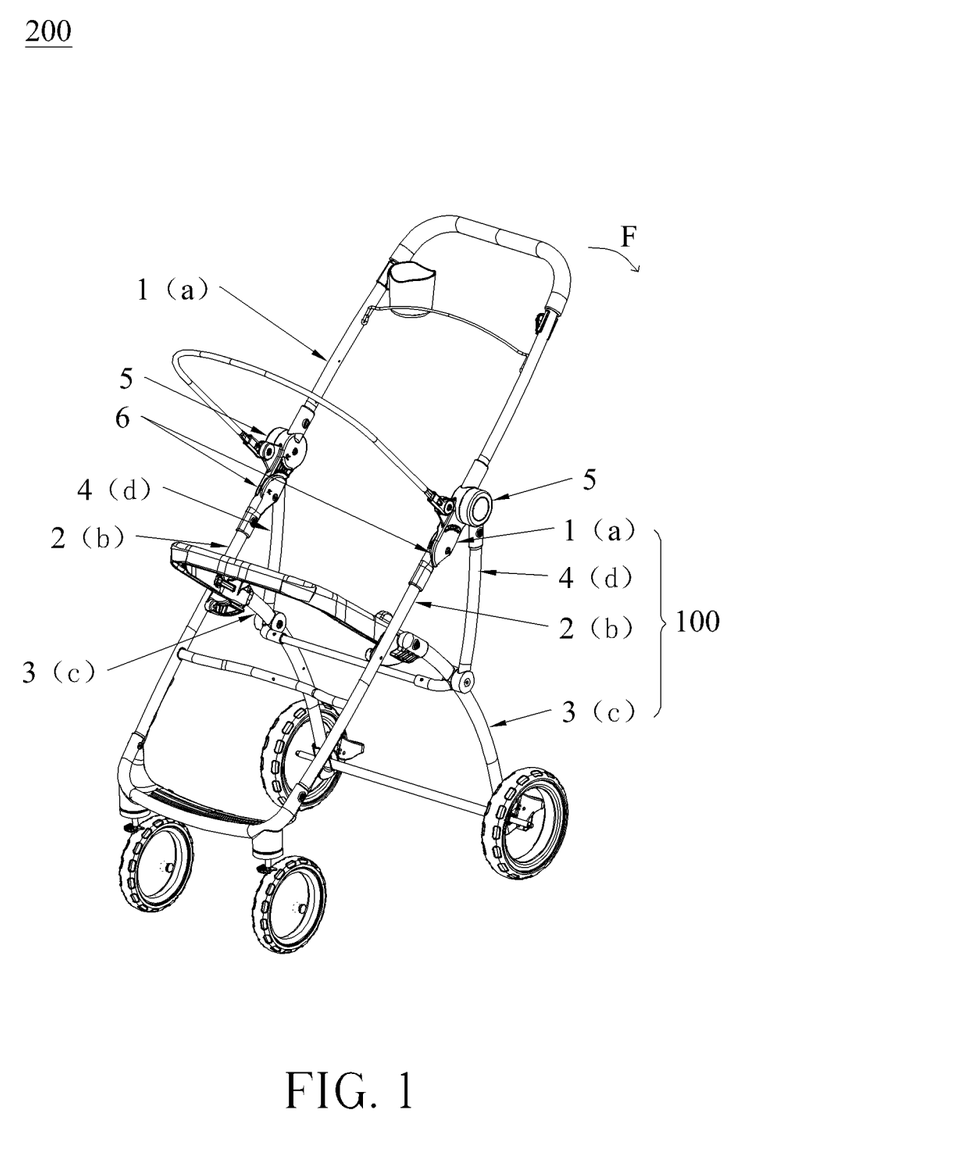
FIG. 1 is a diagram of a baby stroller in an unfolding state according to an embodiment of the present invention.
Figure 2:
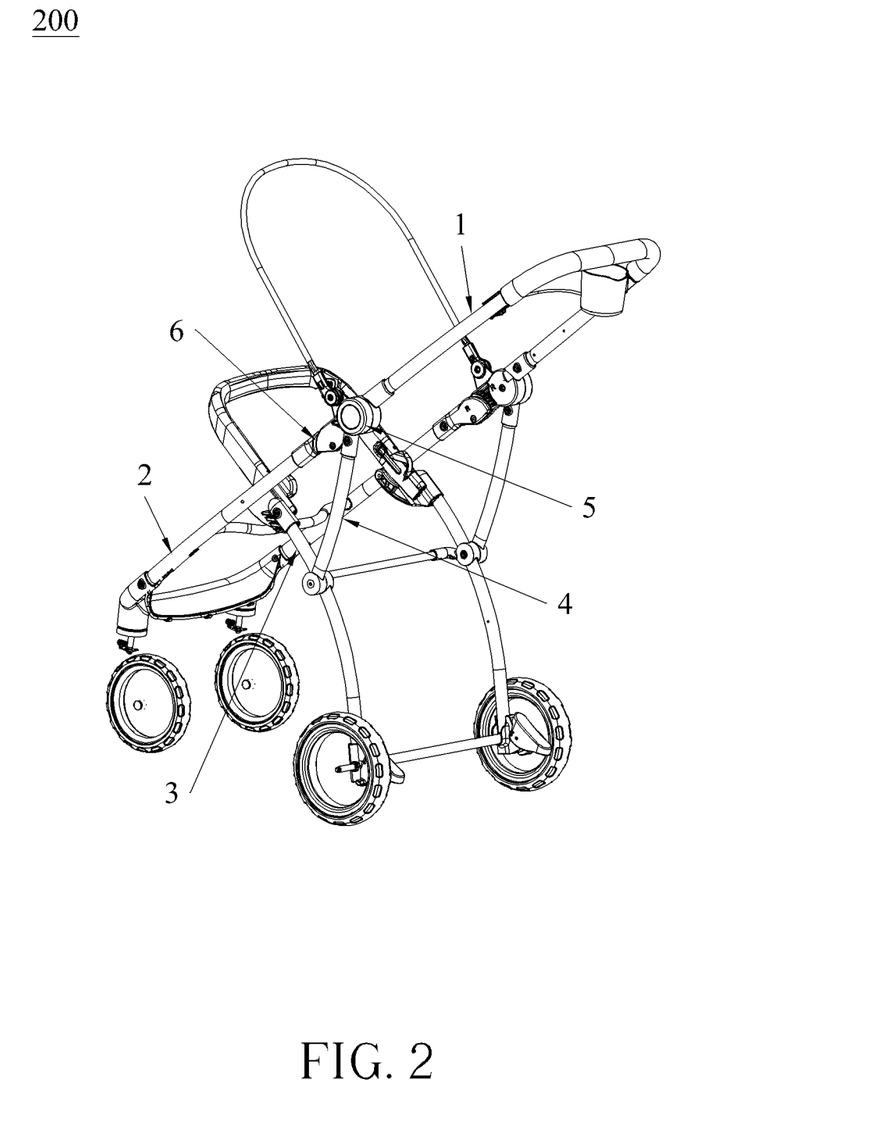
FIG. 2 is a diagram of the baby stroller in the unfolding state in another view according to the embodiment of the present invention.
Figure 3:
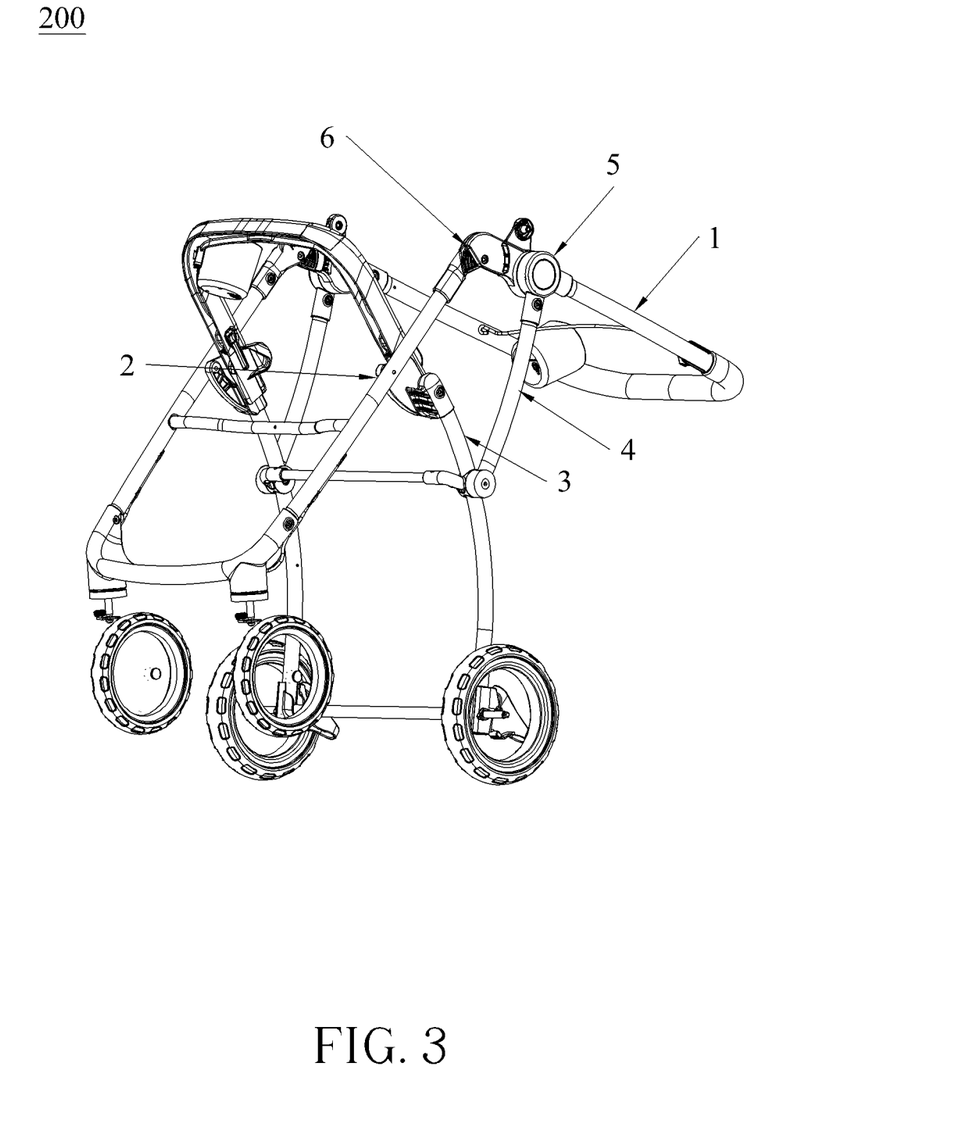
FIG. 3 is a diagram of the baby stroller during a folding process according to the embodiment of the present invention.
Figure 4:
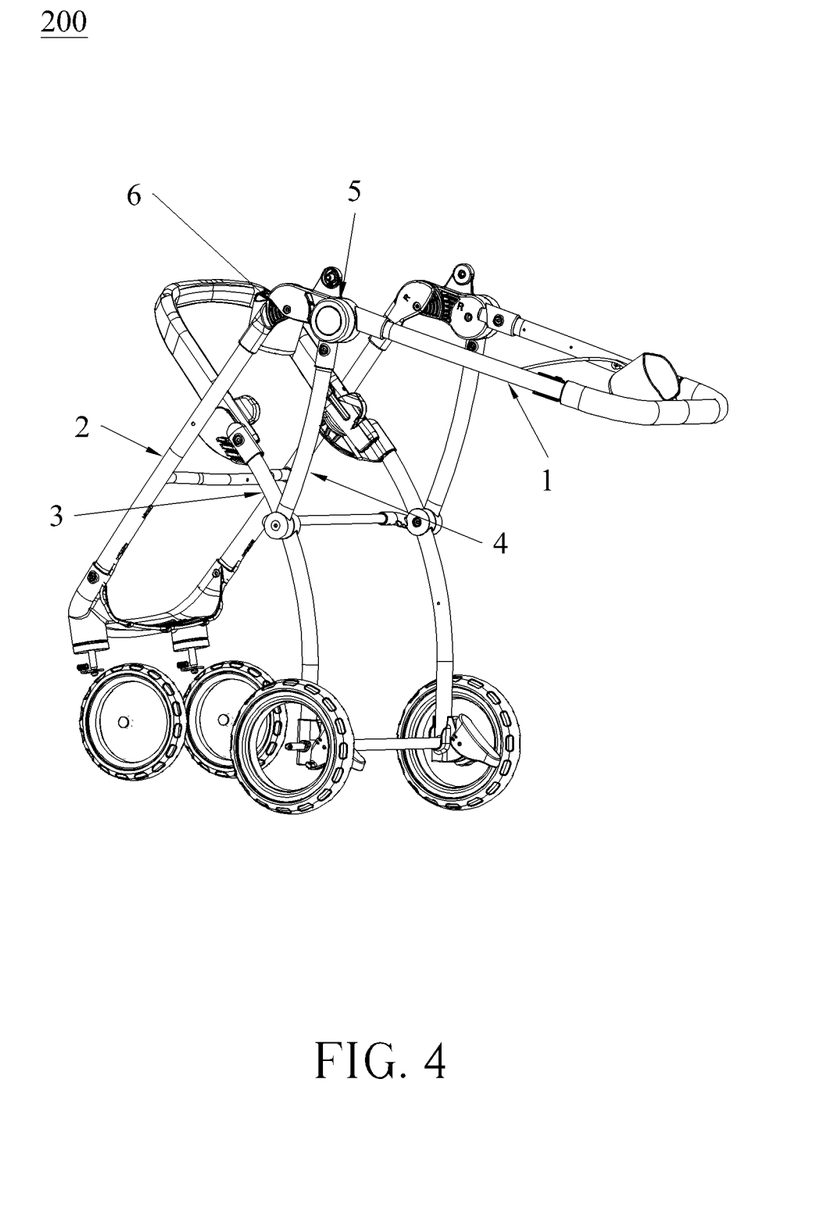
FIG. 4 is a diagram of the baby stroller during the folding process in another view according to the embodiment of the present invention.
Figure 5:
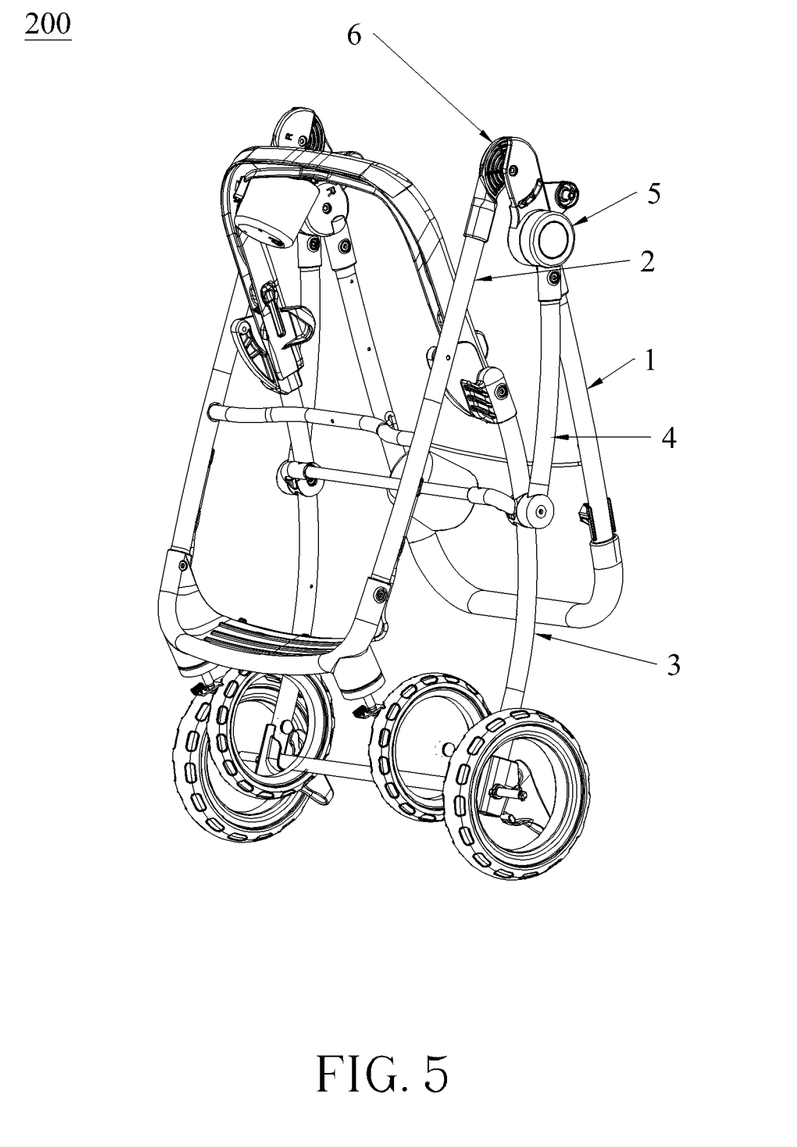
FIG. 5 is a diagram of the baby stroller in a folding state according to the embodiment of the present invention.

In the present invention, the vehicle frame 100 can include a first tube a, a second tube b, a third tube c and a foldable unit. The first tube a is pivoted to the second tube b. The second tube b is pivoted to the third tube c. The foldable unit can include a fourth tube d. An end of the fourth tube d is pivoted to the first tube a, and the other end of the fourth tube d is pivoted to the third tube c. The first tube a, the second tube b, the third tube c and the fourth tube d are pivoted sequentially to form a linkage mechanism. The linkage mechanism formed by the first tube a, the second tube b, the third tube c and the fourth tube d can be a quadrangle structure. When the first tube a is rotated in a direction F shown in FIG. 1, rotation of the first tube a can move the second tube b and the third tube c close to each other via link of the fourth tube d, so as to fold the second tube b and the third tube c for switching the vehicle frame 100 into a folding state. When the vehicle frame 100 is kept in the folding state, the first tube a can be rotated in a direction opposite to the direction F shown in FIG. 1, rotation of the first tube a can move the second tube b and the third tube c, which are folded, away from each other via the link of the fourth tube d, so as to switch the vehicle frame 100 into an unfolding state.

Thus, the rotation of the first tube a relative to the second tube b can simultaneously move the second tube b and the third tube c close to each other for folding, so that only the rotation of the first tube a can simultaneously move the third tube c close to the second tube b for folding, without operating the second tube b and the third tube c for folding. The present invention can provide preferred operative convenience. The vehicle frame 100 of the present invention can be applied to any foldable device, such as a kickstand, a foldable ladder, a foldable wheelchair, and a baby stroller 200, which depends on the design demand.

In order to make a clear description of the vehicle frame 100 of the present invention, the baby stroller 200 shown in FIGS. 1-8 is an example for a detailed illustration. The baby stroller 200 can include a baby seat (not shown in the figures) and the foresaid vehicle frame 100. Please refer to FIG. 1. The first tube a of the vehicle frame 100 can be represented as a handling tube 1 of the baby stroller 200, and the second tube b of the vehicle frame 100 can be represented as a front foot tube 2 of the baby stroller 200, and the third tube c of the vehicle frame 100 can be represented as a rear foot tube 3 of the baby stroller 200, and the fourth tube d of the foldable unit can be represented as a supporting tube 4 of the baby stroller 200. The front foot tube 2 and the rear foot tube 3 can be moved close to each other or away from each other by rotating the handling tube 1 via the link of the supporting tube 4, and the vehicle frame 100 can be folded and unfolded accordingly. Folding and unfolding operation of the vehicle frame 100 can be accomplished only by operating the handling tube 1, without forcing the front foot tube 2 and the rear foot tube 3 of the baby stroller 200 by stooping down in a conventional skill, so that the prevent invention can provide the preferred operative convenience.

Please refer to FIGS. 5-8. The vehicle frame 100 can further include a locking device 5 used to lock the link of the linkage mechanism. The locking device 5 can be disposed on the linkage mechanism. Because the linkage mechanism is formed by connection between the handling tube 1, the front foot tube 2, the rear foot tube 3 and the supporting tube 4, the locking device 5 can lock a linking state of the linkage mechanism to position relative motion between the handling tube 1, the front foot tube 2, the rear foot tube 3 and the supporting tube 4; that is to say, the vehicle frame 100 can be locked at the folding state or the unfolding state via the locking device 5. Please refer to FIG. 6. Because the linkage mechanism is formed by the connection between the handling tube 1, the front foot tube 2, the rear foot tube 3 and the supporting tube 4, the locking device 5 can lock integral motion of the linkage mechanism by positioning relative motion between at least two of the handling tube 1, the front foot tube 2, the rear foot tube 3 and the supporting tube 4, and the vehicle frame 100 can be locked accordingly. For example, the locking device 5 can be disposed between the handling tube 1 and the front foot tube 2, which means the handling tube 1 can be pivoted to the front foot tube 2 via the locking device 5; further, the locking device 5 may be disposed between the front foot tube 2 and the rear foot tube 3, and the front foot tube 2 may be pivoted to the rear foot tube 3 via the locking device 5; further, the locking device 5 may be disposed between the supporting tube 4 and the rear foot tube 3, and the supporting tube 4 may be pivoted to the rear foot tube 3 via the locking device 5. In an embodiment of the present invention, the locking device 5 is disposed between the handling tube 1 and the supporting tube 4, and therefore the handling tube 1 is pivoted to the supporting tube 4 via the locking device 5. Position of the locking device 5 is not limited to the above embodiments, which depends on the actual demand.

Figure 6:
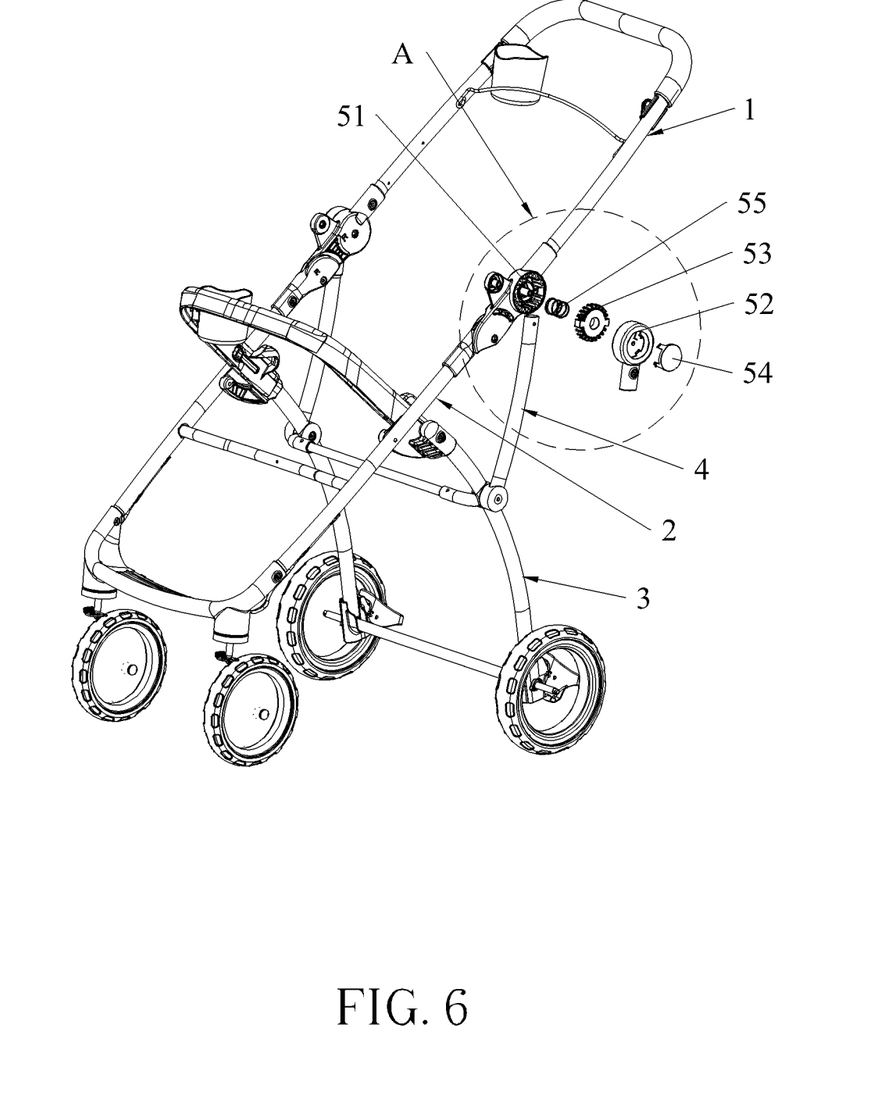
FIG. 6 is a diagram of the baby stroller in the unfolding state and a locking device in a separated state according to the embodiment of the present invention.
Figure 7:
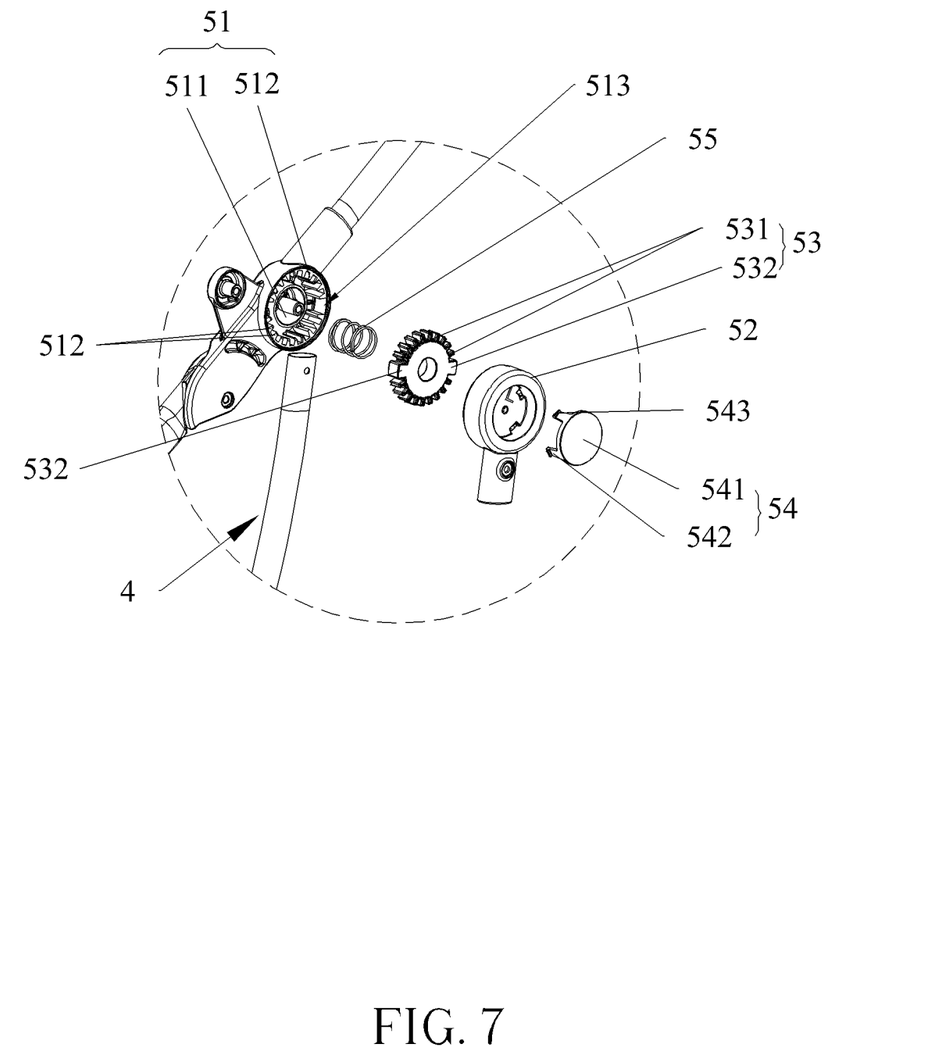
FIG. 7 is an enlarged diagram of a region A shown in FIG. 6.
Figure 8:
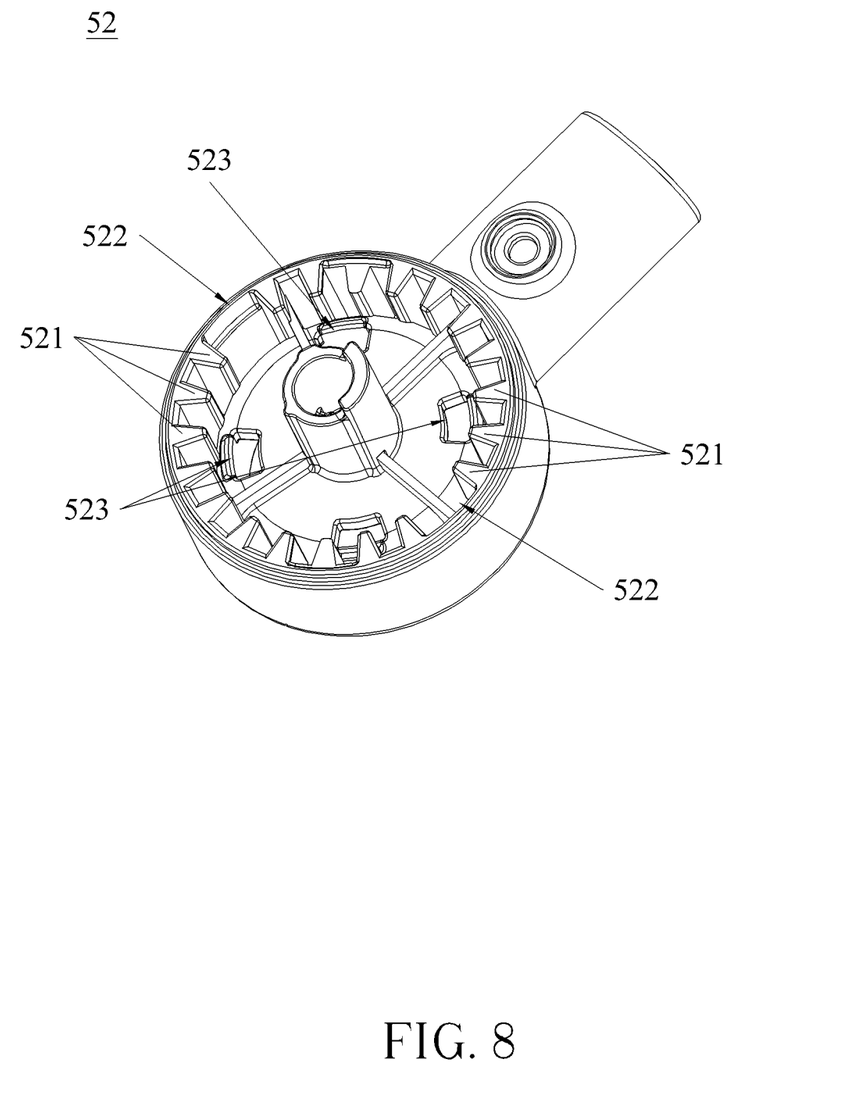
FIG. 8 is a diagram of a second installing component of the baby stroller according to the embodiment of the present invention.

Please refer to FIGS. 6-8. The locking device 5 can include a first installing component 51, a second installing component 52, a locking component 53, a releasing button 54 and a resilient component 55. The handling tube 1 can be connected to the first installing component 51. The supporting tube 4 can be connected to the second installing component 52. The first installing component 51 can be disposed inside the second installing component 52. The first installing component 51 can be pivoted to the second installing component 52 for pivotably connecting the handling tube 1 with the supporting tube 4. The locking component 53 can be movably disposed between the first installing component 51 and the second installing component 52. A pivot of the first installing component 51 relative to the second installing component 52 can be locked and unlocked via motion of the locking component 53. The locking component 53 can be moved between the first installing component 51 and the second installing component 52, and position change of the locking component 53 between the first installing component 51 and the second installing component 52 can constrain relative motion of the first installing component 51 and the second installing component 52 for locking relative position between the first installing component 51 and the second installing component 52; further, constraint on the first installing component 51 and the second installing component 52 can be released, so that the first installing component 51 can be freely pivoted relative to the second installing component 52 at any angle, and an angle between the handling tube 1 and the supporting tube 4 can be adjusted accordingly. The releasing button 54 can be slidably disposed on the second installing component 52, and further can be connected to the locking component 53. A slide of the releasing button 54 relative to the second installing component 52 can lock or unlock the locking component 53. The releasing button 54 can drive the locking component 53 to move between the first installing component 51 and the second installing component 52, so as to lock and unlock the locking component 53. The releasing button 54 can be slid manually by artificial operation or automatically by any other driving device, which depends on the actual demand.

Please refer to FIGS. 6-8. The releasing button 54 and the locking component 53 can resiliently contact against to each other, which means the releasing button 54 can control motion of the locking component 53 by resiliently contacting against the locking component 53. The releasing button 54 can include a pressing main body 541 and a contacting portion 542. The contacting portion 542 can be stretched from the pressing main body 541 toward the locking component 53. The contacting portion 542 can slidably pass through the second installing component 52 and contact against the locking component 53. The pressing main body 541 can be driven by an external force to contact the contacting portion 542 against the locking component 53, which has advantages of simple structure and easy operation. In addition, the contacting portion 542 can be disposed around the pressing main body 541, and the contacting portion 542 can be bent outward to form a blocking portion 543. The second installing component 52 can include a constraining hole structure 523 matched with the blocking portion 543 and adapted to constrain a movement of the blocking portion 543. Utilizing the constraining hole structure 523 to constrain the blocking portion 543 can adjust a slide stroke of the releasing button 54, which has an advantage of simple structure.

The resilient component 55 can be disposed between the first installing component 51 and the locking component 53 and kept in a compression state. The resilient component 55 can always press the locking component 53 onto the second installing component 52, so that the releasing button 54 and the locking component 53 can resiliently contact against to each other. The locking component 53 can be moved between the first installing component 51 and the second installing component 52 via an assembly of the releasing button 54 and the resilient component 55, which has advantages of simple structure and easy operation. The first installing component 51 can include an accommodating chamber 511 adapted to accommodate the resilient component 55, and the resilient component 55 can apply stable force on the locking component 53. The resilient component 55 preferably can be a compression spring. The locking component 53 can include an engaging tooth 531. The first installing component 51 can include a first tooth 512 matched with the engaging tooth 531, and the second installing component 52 can include a second tooth 521 matched with the engaging tooth 531. The engaging tooth 531 can be simultaneously engaged with the first tooth 512 and the second tooth 521 to set a locking state via press of the resilient component 55. The engaging tooth 531 can overcome a resilient force of the resilient component 55 when the releasing button 54 is pushed, so as to remove from the second tooth 521 for unlocking. Thus, when the engaging tooth 531 is simultaneously engaged with the first tooth 512 and the second tooth 521, relative position between the first tooth 512 and the second tooth 521 can be locked by utilization of the engaging tooth 531, and the first installing component 51 cannot be pivoted relative to the second installing component 52, so that the pivoted angle between the handling tube 1 and the supporting tube 4 can be locked.

When the engaging tooth 531 overcomes the resilient force in pushing of the releasing button 54 and is removed from the second tooth 521 to completely insert into the first tooth 512, the relative position between the first tooth 512 and the second tooth 521 is not constrained by the engaging tooth 531 due to disengagement of the engaging tooth 531 and the second tooth 521, so that the first installing component 51 can be pivoted relative to the second installing component 52, which means the handling tube 1 and the supporting tube 4 can be freely pivoted to each other, and has advantages of simple structure and flexible locking/unlocking operation. The engaging tooth 531 preferably can be arranged as a circular form; accordingly, the first tooth 512 and the second tooth 521 are arranged as the circular form, so as to stabilize locking function of the engaging tooth 531. Besides, the locking component 53 can include a positioning protrusion 532; the first installing component 51 can include a first sunken portion 513 matched with and be inserted by the positioning protrusion 532, and the second installing component 52 can include a second sunken portion 522 matched with and be inserted by the positioning protrusion 532. The positioning protrusion 532 can be disposed adjacent to the engaging tooth 531. The first tooth 512 can be disposed adjacent to the first sunken portion 513. The second tooth 521 can be disposed adjacent to the second sunken portion 522. In the locking state, two sides of the positioning protrusion 532 respectively insert into the first sunken portion 513 and the second sunken portion 522, which means the positioning protrusion 532 can be simultaneously engaged with the first sunken portion 513 and the second sunken portion 522. The positioning protrusion 532 can be used to lock relative position between the first sunken portion 513 and the second sunken portion 522, so that the first installing component 51 cannot be pivoted relative to the second installing component 52, and the pivoted angle between the handling tube 1 and the supporting tube 4 can be locked accordingly.

When the positioning protrusion 532 overcomes the resilient force in pushing of the releasing button 54 and is removed from the second sunken portion 522 to completely insert into the first sunken portion 513, the relative position between the first sunken portion 513 and the second sunken portion 522 is not constrained by the positioning protrusion 532 due to disengagement of the positioning protrusion 532 and the second sunken portion 522, so that the first installing component 51 can be pivoted relative to the second installing component 52, and the handling tube 1 and the supporting tube 4 can be freely pivoted to each other. A cross section of the positioning protrusion 532 can be different from a cross section of the engaging tooth 531. The handling tube 1 and the supporting tube 4 can be locked only if the engaging tooth 531 is simultaneously engaged with the first tooth 512 and the second tooth 521 and the positioning protrusion 532 is simultaneously engaged with the first sunken portion 513 and the second sunken portion 522. An assembly of the engaging tooth 531 and the positioning protrusion 532 can be used to freely adjust the relative position between the positioning protrusion 532 and the engaging tooth 531, for indirectly locking the handling tube 1 and the supporting tube 4 at a targeted angle, so as to prevent false operation and to ensure operation security. In the embodiment, the locking component 53 includes two positioning protrusions 532 arranged relative to the locking component 53 in symmetry, and the engaging tooth 531 is disposed between the two positioning protrusions 532. Arrangement of the positioning protrusions 532, the locking component 53 and the engaging tooth 531 is not limited to the above-mentioned embodiment, which depends on design demand.

Please refer to FIGS. 1-5. The vehicle frame 100 can include a constraining structure 6 disposed between the handling tube 1 and the front foot tube 2. The handling tube 1 and the front foot tube 2 can be pivoted relative to each other and constrained by the constraining structure 6 for forming a straight pole structure. The supporting tube 4 can be supported between the handling tube 1 and the rear foot tube 3, and an assembly of the supporting tube 4 and the constraining structure 6 can increase integral stability of the vehicle frame 100. For example, the constraining structure 6 can be, but not limited to, a constraint joint. The supporting tube 4 preferably can be pivoted to a middle portion of the handling tube 1 and a middle portion of the rear foot tube 3, so as to effectively increase the integral stability of the vehicle frame 100.

In conclusion, a detailed statement of operation process of the baby stroller 200 in the present invention is illustrated as following paragraphs and can be shown in FIGS. 1-8.

When the baby stroller 200 in the unfolding state is prepared to fold (the unfolding state can be shown in FIGS. 1-2), the pressing main body 541 of the releasing button 54 can be pressed to slide the contacting portion 542 of the releasing button 54 inside the second installing component 52 for contacting against the locking component 53, and the locking component 53 can overcome the resilient force of the resilient component 55 and be removed from the second installing component 52; in the meantime, the engaging tooth 531 can be disengaged from the second tooth 521 and fully insert into the first tooth 512, and the positioning protrusion 532 can be disengaged from the second sunken portion 522 and fully insert into the first sunken portion 513, so that the engaging tooth 531 cannot constrain the relative position between the first tooth 512 and the second tooth 521, and the positioning protrusion 532 cannot constrain the relative position between the first sunken portion 513 and the second sunken portion 522. Then, the first installing component 51 can be pivoted relative to the second installing component 52, and handling tube 1 and the supporting tube 4 can be kept in an unlocking state.

The handling tube 1 can be rotated to pivot the handling tube 1 relative to the front foot tube 2 for folding and further to rotate the supporting tube 4. Rotation of the supporting tube 4 can move the rear foot tube 3 and the front foot tube 2 close to each other for pivoting and folding the rear foot tube 3 and the front foot tube 2, and a state between the folding state and the unfolding can be shown in FIGS. 3-4. When the baby stroller 200 is completely switched into the folding state, which can be shown in FIG. 5, the engaging tooth 531 simultaneously aligns with the first tooth 512 and the second tooth 521, and the positioning protrusion 532 simultaneously aligns with the first sunken portion 513 and the second sunken portion 522. The resilient component 55 can press and move the locking component 53 toward the second installing component 52, so that the engaging tooth 531 can simultaneously insert into the first tooth 512 and the second tooth 521, and the positioning protrusion 532 can simultaneously insert into the first sunken portion 513 and the second sunken portion 522. The releasing button 54 can be slidably moved to a limited position under a constraint of the blocking portion 543. The engaging tooth 531 can constrain the relative position between the first tooth 512 and the second tooth 521, and the positioning protrusion 532 can constrain the relative position between the first sunken portion 513 and the second sunken portion 522, so that the first installing component 51 cannot be pivoted relative to the second installing component 52, and the handling tube 1 and the supporting tube 4 are kept in the locking state, which means the linkage mechanism and the baby stroller 200 are kept in the locking state.

As shown in FIGS. 1-8, the foldable unit can be disposed on the vehicle frame 100. The foldable unit can include the supporting tube 4. An end of the supporting tube 4 can be pivoted to the handling tube 1, and the other end of the supporting tube 4 can be pivoted to the rear foot tube 3. The handling tube 1, the front foot tube 2, the rear foot tube 3 and the supporting tube 4 are connected to form the linkage mechanism. The handling tube 1 can be rotated to move the front foot tube 2 and the rear foot tube 3 close to each other via the link of the supporting tube 4, so as to fold the front foot tube 2 and the rear foot tube 3, and the handling tube 1 further can be rotated to move the front foot tube 2 and the rear foot tube 3 away from each other to unfold the front foot tube 2 and the rear foot tube 3, so that the vehicle frame 100 can be folded and unfolded in accordance with foresaid operation. Thus, the rotation of the handling tube 1 relative to the front foot tube 2 can be sufficient to simultaneously move the front foot tube 2 and the rear foot tube 3 close to each other for folding, which means only the rotation of the handling tube 1 can move the rear foot tube 3 close to the front foot tube 2 for folding the two tubes. The present invention can increase the operative convenience without any extra folding operation applied to the front foot tube 2 and the rear foot tube 3. Because the rear foot tube 3 is kept in the folding state when the handling tube 1 and the front foot tube 2 are folded, the rear foot tube 3 can be locked in the folding state by locking function applied to the folding state of the handling tube 1 and the front foot tube 2. The present invention can not only simplify operative motion or operative process about locking and unlocking function, but also omit a locking device disposed between the front foot tube 2 and the rear foot tube 3, so as to simplify the integral structure and decrease production cost of the vehicle frame 100. Therefore, the vehicle frame 100 of the present invention has advantages of simple structure, easy operation and low production cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vehicle frame, comprising:
   a first tube;
   a second tube pivoted to the first tube;
   a third tube pivoted to the second tube; and
   a foldable unit comprising a fourth tube, an end of the fourth tube being pivoted to the first tube, and the other end of the fourth tube being pivoted to the third tube, a linkage mechanism being formed by connection between the first tube, the second tube, the third tube and the fourth tube, rotation of the first tube moving the second tube and the third tube close to each other or away from each other via link of the fourth tube for folding or unfolding the vehicle frame;
   a locking device disposed on the linkage mechanism and adapted to lock motion of the linkage mechanism, the first tube and the fourth tube being pivoted via the locking device, wherein the locking device comprises a first installing component, a second installing component and a locking component, the first tube is connected to the first installing component, the fourth tube is connected to the second installing component, the first installing component is pivoted to the second installing component, the locking component is movably disposed between the first installing component and the second installing component, so as to lock or unlock a pivot of the first installing component relative to the second installing component via motion of the locking component.

2. The vehicle frame of claim 1, wherein the locking device further comprises a releasing button slidably disposed on the second installing component and connected to the locking component, the locking component is locked or unlocked via a slide of the releasing button relative to the second installing component.

3. The vehicle frame of claim 2, wherein the locking device further comprises a resilient component disposed between the first installing component and the locking component, and adapted to press the locking component onto the second installing component for resiliently contacting the locking component against the releasing button.

4. The vehicle frame of claim 3, wherein the locking component comprises an engaging tooth, the first installing component comprises a first tooth matched with the engaging tooth, the second installing component comprises a second tooth matched with the engaging tooth, the engaging tooth is engaged with the first tooth and the second tooth for forming a locking state via press of the resilient component, the engaging tooth is removed from the second tooth for unlocking by overcoming a resilient force of the resilient component via push of the releasing button.

5. The vehicle frame of claim 4, wherein the locking component further comprises a positioning protrusion, the first installing component further comprises a first sunken portion matched with the positioning protrusion, the second installing component further comprises a second sunken portion matched with the positioning protrusion, two sides of the positioning protrusion respectively insert into the first sunken portion and the second sunken portion in the locking state.

6. The vehicle frame of claim 3, wherein the releasing button comprises a pressing main body and a contacting portion, the contacting portion is stretched from the pressing main body toward the locking component, and the contacting portion slidably passes through the second installing component and contacts against the locking component.

7. The vehicle frame of claim 6, wherein the contacting portion is bent outward to form a blocking portion.

8. The vehicle frame of claim 1, wherein a constraining structure is disposed between the first tube and the second tube, the first tube and the second tube are pivoted relative to each other and constrained by the constraining structure to form a straight pole structure, and the fourth tube is supported between the first tube and the third tube.

9. The vehicle frame of claim 1, wherein the fourth tube is pivoted to a middle portion of the first tube and further pivoted to a middle portion of the third tube.

10. A baby stroller, comprising:
a vehicle frame, comprising a handling tube, a front foot tube and a rear foot tube, the handling tube being pivoted to the front foot tube, the front foot tube being pivoted to the rear foot tube, wherein the vehicle frame further comprises:
a foldable unit comprising a supporting tube, an end of the supporting tube being pivoted to the handling tube, and the other end of the supporting tube being pivoted to the rear foot tube, a linkage mechanism being formed by connection between the handling tube, the front foot tube, the rear foot tube and the supporting tube, rotation of the handling tube moving the front foot tube and the rear foot tube close to each other or away from each other via link of the supporting tube for folding or unfolding the vehicle frame; and
a locking device disposed on the linkage mechanism and adapted to lock motion of the linkage mechanism, the handling tube and the supporting tube being pivoted via the locking device, wherein the locking device comprises a first installing component, a second installing component and a locking component, the handling tube is connected to the first installing component, the supporting tube is connected to the second installing component, the first installing component is pivoted to the second installing component, the locking component is movably disposed between the first installing component and the second installing component, so as to lock or unlock a pivot of the first installing component relative to the second installing component via motion of the locking component.

11. The baby stroller of claim 10, wherein the locking device further comprises a releasing button slidably disposed on the second installing component and connected to the locking component, the locking component is locked or unlocked via a slide of the releasing button relative to the second installing component.

12. The baby stroller of claim 11, wherein the locking device further comprises a resilient component disposed between the first installing component and the locking component, and adapted to press the locking component onto the second installing component for resiliently contacting the locking component against the releasing button.

13. The baby stroller of claim 12, wherein the locking component comprises an engaging tooth, the first installing component comprises a first tooth matched with the engaging tooth, the second installing component comprises a second tooth matched with the engaging tooth, the engaging tooth is engaged with the first tooth and the second tooth for forming a locking state via press of the resilient component, the engaging tooth is removed from the second tooth for unlocking by overcoming a resilient force of the resilient component via push of the releasing button.

14. The baby stroller of claim 13, wherein the locking component further comprises a positioning protrusion, the first installing component further comprises a first sunken portion matched with the positioning protrusion, the second installing component further comprises a second sunken portion matched with the positioning protrusion, two sides of the positioning protrusion respectively insert into the first sunken portion and the second sunken portion in the locking state.

15. The baby stroller of claim 12, wherein the releasing button comprises a pressing main body and a contacting portion, the contacting portion is stretched from the pressing main body toward the locking component, and the contacting portion slidably passes through the second installing component and contacts against the locking component.

16. The baby stroller of claim 15, wherein the contacting portion is bent outward to form a blocking portion.

17. The baby stroller of claim 10, wherein a constraining structure is disposed between the handling tube and the front foot tube, the handling tube and the front foot tube are pivoted relative to each other and constrained by the constraining structure to form a straight pole structure, and the supporting tube is supported between the handling tube and the rear foot tube.

18. The baby stroller of claim 10, wherein the supporting tube is pivoted to a middle portion of the handling tube and further pivoted to a middle portion of the rear foot tube.

* * * * *